(12) United States Patent
Jeon et al.

(10) Patent No.: US 9,012,058 B2
(45) Date of Patent: Apr. 21, 2015

(54) LITHIUM SECONDARY BATTERY

(75) Inventors: Jong-Ho Jeon, Daejeon (KR); Doo-Kyung Yang, Daejeon (KR); Sung-Hoon Yu, Daejeon (KR); Min-Hyung Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/447,872

(22) Filed: Apr. 16, 2012

(65) Prior Publication Data

US 2012/0196191 A1    Aug. 2, 2012

Related U.S. Application Data

(63) Continuation of application No. PCT/KR2011/009237, filed on Nov. 30, 2011.

(30) Foreign Application Priority Data

Nov. 30, 2010   (KR) .................. 10-2010-0120715
Nov. 30, 2011   (KR) .................. 10-2011-0127342

(51) Int. Cl.
    *H01M 2/14*        (2006.01)
    *H01M 2/16*        (2006.01)
    *H01M 10/0525*   (2010.01)
    *H01M 10/0567*   (2010.01)

(52) U.S. Cl.
    CPC ............ *H01M 2/1686* (2013.01); *H01M 2/166* (2013.01); *H01M 10/0525* (2013.01); *H01M 10/0567* (2013.01); *Y02T 10/7011* (2013.01); *Y02E 60/122* (2013.01)

(58) Field of Classification Search
    USPC ................... 429/129, 247, 249, 332
    See application file for complete search history.

(56) References Cited

U.S. PATENT DOCUMENTS

2006/0008700 A1 *   1/2006   Yong et al. .................... 429/144
2008/0020287 A1      1/2008   Cho et al.

FOREIGN PATENT DOCUMENTS

| CN | 1969407 A | 5/2007 |
| KR | 10-2006-0072065 A | 6/2006 |
| KR | 10-2007-0000231 A | 1/2007 |
| KR | 10-2008-0004928 A | 1/2008 |
| KR | 10-2008-0101043 A | 11/2008 |

* cited by examiner

*Primary Examiner* — Matthew Merkling
(74) *Attorney, Agent, or Firm* — Birch, Stewart, Kolasch & Birch, LLP

(57) ABSTRACT

Disclosed is a lithium secondary battery. The lithium secondary battery includes a cathode, an anode, a separator and a non-aqueous electrolyte solution. The separator includes a porous substrate, and a coating layer coated on at least one surface of the porous substrate and including a mixture of inorganic particles and a binder polymer. The non-aqueous electrolyte solution contains an ionizable lithium salt, an organic solvent, and a dinitrile compound having a specific structure. The lithium secondary battery is very safe without side reactions of the electrolyte solution. Therefore, the lithium secondary battery exhibits excellent cycle life and output performance characteristics.

12 Claims, No Drawings

LITHIUM SECONDARY BATTERY

CROSS-REFERENCE TO RELATED APPLICATION

This application is a continuation of International Application PCT/KR2011/009237 filed on Nov. 30, 2011, which claims priority to Korean Patent Application Nos. 10-2010-0120715 and 10-2011-0127342 filed in the Republic of Korea on Nov. 30, 2010 and Nov. 30, 2011, respectively, the entire contents of which are incorporated herein by reference.

TECHNICAL FIELD

The present disclosure relates to a lithium secondary battery, and more particularly to a lithium secondary battery with excellent cycle characteristics and output characteristics.

BACKGROUND ART

In recent years, there has been increasing interest in energy storage technologies. As the application fields of energy storage technologies have been extended to mobile phones, camcorders, notebook computers and even electric cars, there has been a growing demand for high energy-density batteries as power sources for such electronic devices. In response to this demand, research on lithium secondary batteries is being actively undertaken.

Many companies have produced a variety of lithium secondary batteries with different safety characteristics. It is very important to evaluate and ensure safety of such lithium secondary batteries. The most important consideration for safety is that operational failure or malfunction of lithium secondary batteries should not cause injury to users. For this purpose, safety regulations strictly restrict the possibilities of dangers (such as fire and smoke) of lithium secondary batteries. In connection with the safety characteristics of a lithium secondary battery including a separator, overheating of the lithium secondary battery may cause thermal runaway or puncture of the separator may pose an increased risk of explosion. In particular, a porous polyolefin substrate commonly used as a separator of a lithium secondary battery undergoes extreme thermal shrinkage at a temperature of 100° C. or higher due to its material characteristics and production processes including elongation. This thermal shrinkage behavior may cause short circuits between a cathode and an anode.

Various proposals have been made to solve the above safety problems of lithium secondary batteries. For example, Korean Unexamined Patent Publication Nos. 10-2006-72065 and 10-2007-231 disclose organic-inorganic composite separators, each of which includes a porous substrate and a porous coating layer formed by coating a mixture of inorganic particles and a binder polymer on at least one surface of the porous substrate. The inorganic particles present in the porous coating layer coated on the porous substrate serve as spacers that can maintain a physical shape of the porous coating layer to inhibit the porous substrate from thermal shrinkage when an electrochemical device overheats. Interstitial volumes present between the inorganic particles form fine pores of the porous coating layer.

As the charge/discharge cycles of a battery proceed, metal ions (usually transition metal ions) other than lithium are also dissolved from a lithium-containing metal oxide as a cathode active material and cause decomposition of an electrolyte solution. Along with the recent increasing demand for high-capacity lithium secondary batteries, high voltages are required as conditions for battery operation. However, high-voltage operating conditions primarily increase side reactions of electrolyte solutions and also induce rapid dissolution of transition metals from lithium transition metal oxides as typical cathode active materials. The dissolved transition metals further promote side reactions of electrolyte solutions.

Moreover, it was found that side reactions of electrolyte solutions occur more actively when the conventional organic-inorganic composite separators are used under high-voltage operating conditions than when general porous polyolefin separators are used under the same conditions.

DISCLOSURE

Technical Problem

The present disclosure is designed to solve the problems of the prior art, and therefore it is an object of the present disclosure to provide a lithium secondary battery in which side reactions of an electrolyte solution can be inhibited despite the use of an organic-inorganic composite separator to achieve excellent cycle characteristics and output characteristics.

It is another object of the present disclosure to provide a lithium secondary battery, to which an organic-inorganic composite separator is applied, that has good ability to inhibit side reactions of an electrolyte solution, particularly under high voltage operating conditions, achieving excellent cycle characteristics and output characteristics even under high voltage conditions.

Technical Solution

In order to achieve the above objects, there is provided a lithium secondary battery including a cathode, an anode, a separator and a non-aqueous electrolyte solution, wherein the separator includes a porous substrate and a coating layer coated on at least one surface of the porous substrate and including a mixture of inorganic particles and a binder polymer, and the non-aqueous electrolyte solution contains an ionizable lithium salt, an organic solvent and a dinitrile compound represented by Formula 1:

(1)

wherein one of $R^1$ and $R^2$ and one of $R^3$ and $R^4$ are —R—CN (wherein each R is independently $C_1$-$C_{12}$ alkylene, $C_1$-$C_{12}$ haloalkylene, $C_2$-$C_{12}$ alkenylene, $C_2$-$C_{12}$ alkynylene, $C_7$-$C_{18}$ benzylene, $C_7$-$C_{18}$ halobenzylene, $C_6$-$C_{18}$ arylene or $C_6$-$C_{18}$ haloarylene), and the remainders of $R^1$, $R^2$, $R^3$ and $R^4$ are independently hydrogen, $C_1$-$C_{12}$ alkyl, $C_1$-$C_{12}$ haloalkyl, $C_1$-$C_{12}$ alkoxy, $C_2$-$C_{12}$ alkenyl, $C_3$-$C_{18}$ aryl, $C_3$-$C_{18}$ haloaryl, $C_7$-$C_{18}$ benzyl, $C_7$-$C_{18}$ halobenzyl or halogen.

More specific examples of dinitrile compounds suitable for use in the non-aqueous electrolyte solution include, but are not limited to, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene and 1,6-dicyano-2-methyl-5-methyl-3-hexene. These dinitrile compounds may be used alone or as a mixture of two or more thereof. The nitrile groups of the dinitrile compound may be in cis or trans positions around the double bond. Preferably, the nitrile groups are in trans positions.

The dinitrile compound may be included in an amount of 0.1 to 0.10 parts by weight, based on 100 parts by weight of the lithium salt and the organic solvent. 0.1 to 5 parts by weight is preferred and 0.1 to 2 parts by weight is more preferred.

The lithium salt and the organic solvent of the non-aqueous electrolyte solution may be those known in the art. For example, the organic solvent may be an ether, an ester, an amide, a linear carbonate, a cyclic carbonate or a mixture thereof. Preferably, the organic solvent is a propionate ester represented by Formula 2:

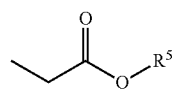

(2)

wherein $R^5$ is a $C_1$-$C_5$ alkyl group.

The porous substrate of the separator may be a porous polyolefin substrate or may be made of polyethylene terephthalate, polybutylene terephthalate, polyester, polyacetal, polyamide, polycarbonate, polyimide, polyether ether ketone, polyethersulfone, polyphenylene oxide, polyphenylene sulfite, polyethylene naphthalene or a mixture thereof. The inorganic particles may be selected from the group consisting of inorganic particles having a dielectric constant of at least 5, inorganic particles having the ability to transport lithium ions, and mixtures thereof.

Advantageous Effects

The lithium secondary battery of the present disclosure is very safe due to the use of the organic-inorganic composite separator. In addition, in the lithium secondary battery of the present disclosure, side reactions of the electrolyte solution arising from the use of the organic-inorganic composite separator can be prevented to achieve improved cycle life and output performance.

Furthermore, in the lithium secondary battery of the present disclosure, acceleration of side reactions of the electrolyte solution arising from the use of the organic-inorganic composite separator can be effectively inhibited. Therefore, the lithium secondary battery of the present disclosure can exhibit excellent cycle life and output performance characteristics even when operated under high voltage conditions.

MODE FOR DISCLOSURE

Hereinafter, preferred embodiments of the present disclosure will be described in detail with reference to the accompanying drawing. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As explained above, the use of an organic-inorganic composite separator guarantees safety of a battery upon overheating, but it increases the occurrence of side reactions of an electrolyte solution than the use of conventional polyolefin separators.

The present inventors have found that inorganic particles present in an organic-inorganic composite separator provide sites where side reactions of an electrolyte solution occur, and accelerate the side reactions. Specifically, as the charge/discharge cycles of a battery proceed, transition metal ions are dissolved from a lithium transition metal oxide as a cathode active material and inorganic particles present in an organic-inorganic composite separator provide sites where the transition metal ions are deposited. The transition metal acts as a catalyst to accelerate side reactions of an electrolyte solution. Therefore, the use of the organic-inorganic composite separator is determined to considerably increase the side reactions of the electrolyte solution. Particularly, larger amounts of the transition metal ions are dissolved from the cathode active material when the battery is operated under high voltage conditions. This brings about an increase in the amount of the transition metal deposited on the separator to considerably accelerate the side reactions of the electrolyte solution.

In order to solve the above problems, the present disclosure provides a lithium secondary battery including a cathode, an anode, a separator and a non-aqueous electrolyte solution, wherein the separator includes a porous substrate and a coating layer coated on at least one surface of the porous substrate and including a mixture of inorganic particles and a binder polymer, and the non-aqueous electrolyte solution contains an ionizable lithium salt, an organic solvent and a dinitrile compound represented by Formula 1:

(1)

wherein one of $R^1$ and $R^2$ and one of $R^3$ and $R^4$ are —R—CN (wherein each R is independently $C_1$-$C_{12}$ alkylene, $C_1$-$C_{12}$ haloalkylene, $C_2$-$C_{12}$ alkenylene, $C_2$-$C_{12}$ alkynylene, $C_7$-$C_{18}$ benzylene, $C_7$-$C_{18}$ halobenzylene, $C_6$-$C_{18}$ arylene or $C_6$-$C_{18}$ haloarylene), and the remainders of $R^1$, $R^2$, $R^3$ and $R^4$ are independently hydrogen, $C_1$-$C_{12}$ alkyl, $C_1$-$C_{12}$ haloalkyl, $C_1$-$C_{12}$ alkoxy, $C_2$-$C_{12}$ alkenyl, $C_3$-$C_{18}$ aryl, $C_3$-$C_{18}$ haloaryl, $C_7$-$C_{18}$ benzyl, $C_7$-$C_{18}$ halobenzyl or halogen.

The nitrile groups at both ends of the dinitrile compound are bonded to transition metal ions dissolved from the cathode to prevent the transition metal ions from being deposited on the surfaces of the inorganic particles present in the organic-inorganic composite separator. The bonding between the dinitrile compound and the transition metal leads to the formation of a bulkier metallic compound. The increased volume of the metallic compound impedes its mobility in the electrolyte solution, which also becomes a cause of inhibiting side reactions of the electrolyte solution caused by the transition metal. Furthermore, the presence of the unsaturated double bond in the dinitrile compound further increases the bonding strength between the terminal nitrile groups and the transition metal, thus being very effective in capturing the transition metal and preventing the transition metal from separating.

Particularly, the dinitrile compound has good ability to capture the transition metal even under high voltage conditions to effectively prevent side reactions of the electrolyte solution. That is, the use of the dinitrile compound not only ensures safety of the battery but also is very useful in improving the cycle performance and output performance of the battery.

Exemplary examples of dinitrile compounds suitable for use in the non-aqueous electrolyte solution include, but are not limited to, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene and 1,6-dicyano-2-methyl-5-methyl-3-hexene. These dinitrile compounds may be used alone or as a mixture of two or more thereof.

The nitrile groups of the dinitrile compound may be in cis or trans positions around the double bond. Preferably, the nitrile groups are in trans positions.

The dinitrile compound may be included in an amount of 0.1 to 10 parts by weight, based on 100 parts by weight of the lithium salt and the organic solvent. 0.1 to 5 parts by weight is preferred and 0.1 to 2 parts by weight is more preferred. If the content of the dinitrile compound is less than 0.1 parts by weight, the ability of the dinitrile compound to capture transition metal ions may deteriorate. Meanwhile, if the content of the dinitrile compound exceeds 10 parts by weight, the viscosity of the electrolyte solution may increase excessively.

The lithium salt and the organic solvent of the non-aqueous electrolyte solution may be those commonly used in the art.

Examples of anions of lithium salts suitable for use in the non-aqueous electrolyte solution include, but are not limited to, $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_4CF_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Non-limiting examples of organic solvents suitable for use in the non-aqueous electrolyte solution include, but are not limited to, ether, ester, amide, linear carbonate and cyclic carbonate. These organic solvents may be used alone or as a mixture of two or more thereof.

The non-aqueous electrolyte solution may include a carbonate compound, such as a cyclic carbonate, a linear carbonate or a mixture thereof, as a representative example of the organic solvent. Specifically, the cyclic carbonate compound may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, halides thereof, and mixtures thereof. The linear carbonate compound may be selected from the group consisting of, but not limited to, dimethyl carbonate (DMC), diethyl carbonate (DEC), dipropyl carbonate, ethyl methyl carbonate (EMC), methyl propyl carbonate, ethyl propyl carbonate, and mixtures thereof.

Ethylene carbonate and propylene carbonate, which are highly viscous and high dielectric constants cyclic carbonates, are particularly preferred because of their good ability to dissociate the lithium salt present in the electrolyte solution. A mixture of such a cyclic carbonate and a linear carbonate whose viscosity and dielectric constant are low, such as dimethyl carbonate or diethyl carbonate, in a suitable ratio is more preferably used because it can be used to prepare an electrolyte solution having a high electrical conductivity.

Examples of the ether include, but are not limited to, dimethyl ether, diethyl ether, dipropyl ether, methyl ethyl ether, methyl propyl ether and ethyl propyl ether. These ethers may be used alone or as a mixture of two or more thereof.

Examples of the ester include, but are not limited to, methyl acetate, ethyl acetate, propyl acetate, methyl propionate, ethyl propionate, γ-butyrolactone, γ-valerolactone, γ-caprolactone, σ-valerolactone and ε-caprolactone. These esters may be used alone or as a mixture of two or more thereof. Preferred is a propionate represented by Formula 2:

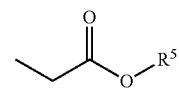

(2)

wherein $R^5$ is a $C_1$-$C_5$ alkyl group.

The propionate of Formula 2 may be advantageous when used under high-voltage operating conditions.

Specifically, as the propionate of Formula 2, there can be exemplified methyl propionate, ethyl propionate or propyl propionate.

The non-aqueous electrolyte solution for the lithium secondary battery of the present disclosure may further include at least one additive for the formation of a solid electrolyte interface (SEI) layer. The additive may be any of those known in the art so long as it does not detract from the objects of the present disclosure. The additive may be selected from the group consisting of, but not limited to, cyclic sulfites, saturated sultones, unsaturated sultones, acyclic sulfones, and mixtures thereof. One of the cyclic carbonates described above, for example, vinylene carbonate and vinyl ethylene carbonate, may also be used as the additive for the formation of an SEI layer to improve the life characteristics of the battery.

As the cyclic sulfites, there may be exemplified ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite. As the saturated sultones, there may be exemplified 1,3-propane sultone and 1,4-butane sultone. As the unsaturated sultones, there may be exemplified ethene sultone, 1,3-propene sultone, 1,4-butene sultone and 1-methyl-1,3-propene sultone. As the acyclic sulfones, there may be exemplified divinyl sulfone, dimethyl sulfone, diethyl sulfone, methyl ethyl sulfone and methyl vinyl sulfone.

The content of the additive for the formation of a SEI layer used may suitably vary depending on the specific kind of the additive. For example, the additive may be included in an amount of 0.01 to 10 parts by weight, based on 100 parts by weight of the lithium salt and the organic solvent.

The non-aqueous electrolyte solution may be used without further processing as a liquid electrolyte for the lithium secondary battery. Alternatively, the non-aqueous electrolyte solution may be impregnated into a polymer to prepare a gel polymer electrolyte before use in the lithium secondary battery.

The lithium secondary battery of the present disclosure can be fabricated by injecting the non-aqueous electrolyte solution into an electrode structure consisting of the cathode, the anode and the separator interposed between the electrodes.

As described above, the separator includes a porous substrate and a coating layer coated on at least one surface of the porous substrate and including a mixture of inorganic particles and a binder polymer.

The porous substrate may be a porous polyolefin substrate or may be made of at least one polymer selected from the group consisting of polyethylene terephthalate, polybutylene terephthalate, polyester, polyacetal, polyamide, polycarbonate, polyimide, polyether ether ketone, polyethersulfone, polyphenylene oxide, polyphenylene sulfite and polyethylene naphthalene. The porous polyolefin substrate may be any of those commonly used in the art. More specifically, the porous polyolefin substrate may be a membrane or a non-woven fabric made of at least one polyolefin selected from: polyethylene polymers, such as high density polyethylene, linear low density polyethylene, low density polyethylene and ultrahigh molecular weight polyethylene; polypropylene; polybutylene; and polypentene.

The inorganic particles present in the separator serve as spacers that can maintain a physical shape of the porous coating layer to inhibit the porous substrate from thermal shrinkage when the electrochemical device overheats or to prevent short circuits between both electrodes when thermal runaway takes place. Interstitial volumes present between the inorganic particles become fine pores of the porous coating layer. That is, in the porous coating layer, the binder polymer attaches (that is, connects and fixes) the inorganic particles to each other so as to maintain a state in which the inorganic particles are bound to each other. Another function of the binder polymer is to maintain a state in which the porous coating layer is bound to the porous substrate. In the porous coating layer, the inorganic particles are in substantial contact with each other and have a closest packed structure. Interstitial volumes created between the inorganic particles in contact with each other become pores of the porous coating layer.

The inorganic particles are not specially limited so long as they are electrochemically stable. In other words, the inorganic particles can be used without particular limitation in the present disclosure if they do not undergo oxidation and/or reduction in an operating voltage range applied to the electrochemical device (for example, 0-5 V for Li/Li$^+$). In particular, a high dielectric constant of the inorganic particles can contribute to an increase in the degree of dissociation of an electrolyte salt, for example, a lithium salt, in a liquid electrolyte to improve the ionic conductivity of the electrolyte solution.

For these reasons, it is preferred that the inorganic particles have a high dielectric constant of at least 5, preferably at least 10. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$ particles. These inorganic particles may be used alone or as a mixture thereof.

The inorganic particles may be those that have the ability to transport lithium ions, that is, those that contain lithium atoms and have the function of transferring lithium ions without storing the lithium. Non-limiting examples of the inorganic particles that have the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O-9Al_2O_3-38TiO_2-39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as $LiI$—$Li_2S$—$P_2S_5$ particles. These inorganic particles may be used alone or as a mixture thereof.

The binder polymer is preferably a polymer having a glass transition temperature ($T_g$) in the range of $-200°$ C. to $200°$ C. Within this range, the mechanical properties (e.g., flexibility and elasticity) of the coating layer can be improved.

The binder polymer does not necessarily need to have the ability to conduct ions. However, since the ionic conductivity of the binder polymer can further improve the performance of the electrochemical device, it is preferred that the binder polymer has a dielectric constant as high as possible. In practice, the degree of dissociation of a salt in an electrolyte solution is dependent on the dielectric constant of a solvent in the electrolyte solution. Therefore, a higher dielectric constant of the binder polymer can lead to a higher degree of dissociation of a salt in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 $Mpa^{1/2}$, more preferably between 15 and 25 $Mpa^{1/2}$ and between 30 and 45 $Mpa^{1/2}$. Accordingly, a hydrophilic polymer having many polar groups is preferred as the binder polymer over a hydrophobic polymer, such as a polyolefin. A solubility parameter lower than 15 $Mpa^{1/2}$ or exceeding 45 $Mpa^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, and carboxymethyl cellulose. These binder polymers may be used alone or as a mixture of two or more thereof.

The weight ratio between the inorganic particles and the binder polymer is preferably in the range of 50:50 to 99:1, more preferably 70:30 to 95:5. If the inorganic particles are present in an amount of less than 50% by weight (i.e. the binder polymer is present in a relatively large amount), the pore size and porosity of the porous coating layer may be reduced. Meanwhile, if the inorganic particles are present in an amount exceeding 99% by weight (i.e. the binder polymer is present in a very small amount), the peeling resistance of the porous coating layer may be deteriorated.

A solvent may be used to dissolve the binder polymer. The solvent preferably has a solubility parameter similar to that of the binder polymer and has a low boiling point, which are advantageous for uniform mixing and ease of solvent removal. Non-limiting examples of solvents usable to dissolve the binder polymer include acetone, tetrahydrofuran, methylene chloride, chloroform, dimethylformamide, N-methyl-2-pyrrolidone (NMP), cyclohexane, and water. These solvents may be used alone or as a mixture thereof.

The separator can be obtained by dissolving the binder polymer in the solvent, dispersing the inorganic particles in the solution, applying the dispersion to the porous substrate by a suitable technique known in the art, followed by drying. The pore size and porosity of the separator are preferably from 0.001 to 10 μm and from 5 to 95%, respectively. The thickness of the separator is not particularly limited and can be controlled taking into consideration the battery performance. The thickness of the separator is preferably 1 to 100 μm, more preferably 1 to 30 μm.

The cathode and the anode may be those commonly used to fabricate lithium secondary batteries.

Preferably, the lithium secondary battery of the present disclosure uses a lithium-containing transition metal oxide as a cathode active material. Examples of such lithium-containing transition metal oxides include $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xXi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3). These lithium-containing transition metal oxides may be used alone or as a mixture of two or more thereof. The lithium-containing transition metal oxide may also be coated with a metal (e.g., aluminum (Al)) or a metal oxide. Lithium-containing transition metal sulfides, selenides and halides may also be used.

A mixture of $Li_xCoO_2$ (0.5<x<1.3) and $Li_x(Ni_aCo_bMn_c)O_2$ (0.5<x<1.3, 0<a<1, 0<b<1, 0<c<1, a+b+c=1) or $Li_xCoO_2$ (0.5<x<1.3) coated with aluminum is preferably used as the cathode active material. $Li_x(Ni_aCo_bMn_c)O_2$ (0.5<x<1.3, 0<a<1, 0<b<1, 0<c<1, a+b+c=1) is particularly preferred in that it can exhibit high output characteristics under high voltage conditions.

As an active material of the anode, there can be used a carbon material, lithium metal, silicon or tin capable of intercalating/de intercalating lithium ions. A metal oxide whose potential for lithium is less than 2 V, such as $TiO_2$ or $SnO_2$, may also be used as the anode active material. The use of a carbon material is preferred. The carbon material may be one having low crystallinity or high crystallinity. Representative examples of suitable low-crystallinity carbon materials include soft carbon and hard carbon. Examples of suitable high-crystallinity carbon materials include natural graphite, Kish graphite, pyrolytic carbon, mesophase pitch based carbon fiber, meso-carbon microbeads, mesophase pitches, and high-temperature sintered carbon materials, such as petroleum or coal tar pitch derived cokes.

The cathode and/or the anode may include a binding agent. The binding agent may be selected from various kinds of binder polymers, such as vinylidene fluoride-hexafluoropropylene copolymers (PVDF-co-HFP), polyvinylidene fluoride, polyacrylonitrile and polymethyl methacrylate.

There is no particular restriction on the shape of the lithium secondary battery of the present disclosure. For example, the lithium secondary battery of the present disclosure may be cylindrical or prismatic depending on the shape of a can it employs. Alternatively, the lithium secondary battery of the present disclosure may be of pouch or coin type.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Preparation of Non-aqueous Electrolyte Solution

Ethylene carbonate (EC), fluoroethylene carbonate (FEC) and dimethyl carbonate (DMC) as organic solvents were mixed in a volume ratio of 2:1:7, and $LiPF_6$ as a lithium salt was dissolved therein until the concentration reached 1 M. To 100 parts by weight of the solution were added 0.5 parts by weight of 1,4-dicyano-2-butene, 2 parts by weight of vinylene carbonate (VC) and 3 parts by weight of 1,3-propane sultone (PS) to prepare a non-aqueous electrolyte solution.

Fabrication of Secondary Battery (Production of Electrodes)

A cathode active material containing $LiCoO_2$ coated with Al was applied to an aluminum current collector, and a cathode tab was attached to one end of the current collector so as to protrude upward to produce a cathode. An anode active material containing artificial graphite was applied to a copper current collector, and an anode tab was attached to one end of the current collector so as to protrude upward to produce an anode.

(Production of Separator)

About 5 wt % of polyvinylidene fluoride-co-chlorotrifluoroethylene (PVdF-CTFE) was added to and dissolved in acetone at 50° C. for at least about 12 hr. A mixture of $Al_2O_3$ powder and $BaTiO_3$ powder in a weight ratio of 9:1 was added to the polymer solution such that the ratio of the weight of the polymer to the weight of the two kinds of inorganic particles was 20:80. The inorganic particles were crushed and dispersed in the solution by ball milling for at least 12 hr to prepare a slurry.

The slurry was dip coated on a 20 μm thick porous polyethylene terephthalate membrane (porosity=80%) to form a porous coating layer. The coating thickness was adjusted to about 2 μm. The pore size and porosity of the porous coating layer were at the levels of 0.3 μm and 55%, respectively, as measured using a porosimeter.

(Fabrication of Secondary Battery)

In accordance with a known general procedure, the separator was interposed between the cathode and the anode to construct an electrode assembly, and the non-aqueous electrolyte solution was injected into the electrode assembly to fabricate a lithium secondary battery.

Example 2

Preparation of Non-aqueous Electrolyte Solution

Ethylene carbonate (EC), fluoroethylene carbonate (FEC) and methyl propionate (MP) as organic solvents were mixed in a volume ratio of 2:1:7, and $LiPF_6$ as a lithium salt was dissolved therein until the concentration reached 1 M. To 100 parts by weight of the solution were added 0.5 parts by weight of 1,4-dicyano-2-butene, 2 parts by weight of vinylene carbonate (VC) and 3 parts by weight of 1,3-propane sultone (PS) to prepare a non-aqueous electrolyte solution.

Fabrication of Secondary Battery (Production of Electrodes)

A cathode active material containing $LiCoO_2$ coated with Al was applied to an aluminum current collector, and a cathode tab was attached to one end of the current collector so as to protrude upward to produce a cathode. An anode active material containing artificial graphite was applied to a copper current collector, and an anode tab was attached to one end of the current collector so as to protrude upward to produce an anode.

(Production of Separator)

About 5 wt % of polyvinylidene fluoride-co-chlorotrifluoroethylene (PVdF-CTFE) was added to and dissolved in acetone at 50° C. for at least about 12 hr. A mixture of $Al_2O_3$ powder and $BaTiO_3$ powder in a weight ratio of 9:1 was added to the polymer solution such that the ratio of the weight of the polymer to the weight of the two kinds of inorganic particles was 20:80. The inorganic particles were crushed and dispersed in the solution by ball milling for at least 12 hr to prepare a slurry.

The slurry was dip coated on a 20 μm thick porous polyethylene terephthalate membrane (porosity=80%) to form a porous coating layer. The coating thickness was adjusted to about 2 μm. The pore size and porosity of the porous coating layer were at the levels of 0.3 μm and 55%, respectively, as measured using a porosimeter.

(Fabrication of Secondary Battery)

In accordance with a known general procedure, the separator was interposed between the cathode and the anode to construct an electrode assembly, and the non-aqueous electrolyte solution was injected into the electrode assembly to fabricate a lithium secondary battery.

Example 3

A non-aqueous electrolyte solution was prepared and a lithium secondary battery was fabricated in the same manner as in Example 2, except that 1,4-dicyano-2-butene was used in an amount of 1.0 part by weight.

Example 4

A non-aqueous electrolyte solution was prepared and a lithium secondary battery was fabricated in the same manner as in Example 2, except that 1,4-dicyano-2-butene was used in an amount of 3.0 parts by weight.

Comparative Example 1

A non-aqueous electrolyte solution was prepared and a lithium secondary battery was fabricated in the same manner as in Example 2, except that 1,4-dicyano-2-butene was not used.

Comparative Example 2

A non-aqueous electrolyte solution was prepared and a lithium secondary battery was fabricated in the same manner as in Example 2, except that 2 parts by weight of succinonitrile was used instead of 0.5 parts by weight of 1,4-dicyano-2-butene.

Evaluation of Initial Efficiencies

The lithium secondary batteries fabricated in Examples 1-4 and Comparative Examples 1-2 were aged for 2 days. Thereafter, each of the lithium secondary batteries was charged at a constant current of 600 mA at 23° C. until the voltage reached 4.35 V, and thereafter, the lithium secondary battery was charged at a constant voltage of 4.35 V. Charging was stopped when the charged current reached 150 mA. Then, the lithium secondary battery was allowed to stand for 10 min and was discharged at a constant current of 600 mA until the voltage reached 3.0 V. The charge and discharge cycles were repeated twice.

The rate (%) of the discharge capacity of the battery after the first cycle relative to the charge capacity of the battery after the first cycle was defined as initial efficiency. The results are shown in Table 1.

Evaluation of High-temperature Cycle Capacity Retentions

After completion of the initial efficiency evaluation, each of the lithium secondary batteries fabricated in Examples 1-4 and Comparative Examples 1-2 was charged at a constant current of 2,100 mA at 55° C. until the voltage reached 4.35 V, and thereafter, the lithium secondary battery was charged at a constant voltage of 4.35 V. Charging was stopped when the charged current reached 150 mA. Then, the lithium secondary battery was allowed to stand for 10 min and was discharged at a constant current of 1,500 mA until the voltage reached 3.0 V. The charge and discharge cycles were repeated 300 times. The rate (%) of the discharge capacity of the battery after 300 cycles relative to the discharge capacity of the battery after the first cycle was defined as high-temperature cycle capacity retention M. The results are shown in Table 1.

TABLE 1

|  | Initial efficiency (%) | High-temperature cycle capacity retention (%) |
| --- | --- | --- |
| Example 1 | 90 | 68 |
| Example 2 | 92 | 73 |
| Example 3 | 92 | 81 |
| Example 4 | 91 | 77 |
| Comparative Example 1 | 91 | 6 |
| Comparative Example 2 | 91 | 31 |

As can be seen from the results in Table 1, the lithium secondary batteries of Examples 1-4, each of which includes the non-aqueous electrolyte solution containing the dinitrile compound with a carbon-carbon double bond, had initial efficiencies similar to the lithium secondary batteries of Comparative Examples 1 and 2 but showed markedly improved high-temperature cycle capacity retentions compared to the lithium secondary batteries of Comparative Examples 1 and 2.

It was observed in the lithium secondary batteries of Examples 1-4 that no transition metal ions were deposited on the surfaces of the inorganic particles present in the separators, which is believed to be because the nitrile groups present at both ends of the dinitrile compound are bonded to the metal ions present in the non-aqueous electrolyte solutions. In contrast, in the lithium secondary battery of Comparative Example 1 including the non-aqueous electrolyte solution free of the dinitrile compound, deposition of a considerable amount of the transition metal ions was observed.

What is claimed is:

1. A lithium secondary battery comprising a cathode, an anode, a separator and a non-aqueous electrolyte solution,
    wherein the separator comprises a porous substrate and a coating layer coated on at least one surface of the porous substrate and comprising a mixture of inorganic particles and a binder polymer,
    wherein the non-aqueous electrolyte solution comprises an ionizable lithium salt, an organic solvent and a dinitrile compound;
    wherein the dinitrile compound is 1,4-dicyano-2-butene in an amount of 0.1 to 2 parts by weight, based on 100 parts by weight of the lithium salt and the organic solvent; and
    wherein the nitrile group at both ends of the dinitrile compound are bonded to transition metal ions dissolved from the cathode to prevent the transition metal ions from being deposited of the surfaces of the inorganic particles present in the separator.

2. The lithium secondary battery according to claim 1, wherein the nitrile groups of the dinitrile compound are in trans positions.

3. The lithium secondary battery according to claim 1, wherein the anion of the lithium salt is selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $CF_3)_6P^-$, $CF_3SO_3^-$, $CF_4CF_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

4. The lithium secondary battery according to claim 1, wherein the organic solvent is selected from the group consisting of ether, ester, amide, linear carbonate, cyclic carbonate, and mixtures thereof.

5. The lithium secondary battery according to claim 4, wherein the ester is a propionate ester represented by Formula 2:

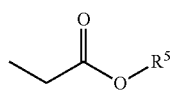

(2)

wherein $R^5$ is a $C_1$-$C_5$ alkyl group.

6. The lithium secondary battery according to claim 1, wherein the porous substrate is a porous polyolefin substrate or is made of at least one polymer selected from the group consisting of polyethylene terephthalate, polybutylene terephthalate, polyester, polyacetal, polyamide, polycarbonate, polyimide, polyether ether ketone, polyethersulfone, polyphenylene oxide, polyphenylene sulfite and polyethylene naphthalene.

7. The lithium secondary battery according to claim 1, wherein the inorganic particles are selected from the group consisting of inorganic particles having a dielectric constant of at least 5, inorganic particles having the ability to transport lithium ions, and mixtures thereof.

8. The lithium secondary battery according to claim 7, wherein the inorganic particles having a dielectric constant of at least 5 are selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ particles, and mixtures thereof.

9. The lithium secondary battery according to claim 7, wherein the inorganic particles having the ability to transport lithium ions are selected from the group consisting of lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles, lithium nitride ($Li_xN_y$, $0<x<4$, $0<y<2$) particles, $SiS_2$ type glass ($Li_xSi_yS_z$, $0<x<3$, $0<y<2$, $0<z<4$) particles, $P_2S_5$ type glass ($Li_xP_yS_z$, $0<x<3$, $0<y<3$, $0<z<7$) particles, and mixtures thereof.

10. The lithium secondary battery according to claim 1, wherein the binder polymer has a solubility parameter between 15 and 45 $Mpa^{1/2}$.

11. The lithium secondary battery according to claim 1, wherein the binder polymer has a dielectric constant between 1.0 and 100 (as measured at a frequency of 1 kHz).

12. The lithium secondary battery according to claim 1, wherein the binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and mixtures thereof.

* * * * *